US006673854B2

(12) United States Patent
Pierre et al.

(10) Patent No.: US 6,673,854 B2
(45) Date of Patent: Jan. 6, 2004

(54) VINYL ACETATE/ETHYLENE EMULSION STABILIZED WITH A PHOSPHATE SURFACTANT

(75) Inventors: Dorian Pierre, Belmont (GB); Stephen John Baines, Horsham (GB); Keith Charles Allen, Horsham (GB)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 125 days.

(21) Appl. No.: 09/971,550

(22) Filed: Oct. 5, 2001

(65) Prior Publication Data

US 2003/0100671 A1 May 29, 2003

(51) Int. Cl.$^7$ ................................................. C08L 1/28
(52) U.S. Cl. ........................... 524/44; 524/43; 524/136; 524/145; 524/459; 524/503; 524/710; 524/711; 524/713; 524/733
(58) Field of Search ................................. 524/710, 713, 524/711, 459, 503, 43, 44, 733, 136, 145

(56) References Cited

U.S. PATENT DOCUMENTS

| | | | | |
|---|---|---|---|---|
| 3,901,841 A | * | 8/1975 | Fuchs et al. | 260/29.6 T |
| 3,922,462 A | * | 11/1975 | Katz et al. | 428/290 |
| 3,963,688 A | | 6/1976 | Lorenz et al. | 526/193 |
| 3,989,661 A | | 11/1976 | Bondy | 260/29.7 |
| 4,073,995 A | * | 2/1978 | Baatz et al. | 428/265 |
| 4,228,047 A | * | 10/1980 | Pippin et al. | 526/209 |
| 4,277,385 A | | 7/1981 | Carroll et al. | 260/29.6 |
| 4,307,007 A | | 12/1981 | Brodoway | 260/30.6 |
| 4,447,570 A | * | 5/1984 | Cook et al. | 524/127 |
| 4,506,057 A | | 3/1985 | Greene et al. | 524/461 |
| 4,609,704 A | * | 9/1986 | Hausman et al. | 524/710 |
| 4,812,510 A | * | 3/1989 | Barnett et al. | 524/807 |
| 4,847,339 A | * | 7/1989 | Heinberg et al. | 526/80 |
| 5,201,948 A | | 4/1993 | Fasano et al. | 106/311 |
| 5,284,905 A | | 2/1994 | Chen et al. | 524/710 |
| 5,286,820 A | | 2/1994 | Mueller-Borges et al. | 526/193 |
| 5,574,081 A | * | 11/1996 | Kroon | 524/56 |
| 5,770,303 A | * | 6/1998 | Weinert et al. | 428/326 |
| 5,824,734 A | * | 10/1998 | Yang | 524/555 |
| 5,874,498 A | | 2/1999 | Daniels et al. | 524/563 |
| 5,905,114 A | | 5/1999 | Baumstark et al. | 524/801 |
| 5,990,224 A | * | 11/1999 | Raynolds et al. | 524/500 |
| 6,028,139 A | * | 2/2000 | Farwaha et al. | 524/715 |
| 6,087,437 A | * | 7/2000 | Farwaha et al. | 524/555 |
| 6,262,169 B1 | * | 7/2001 | Helmer et al. | 524/555 |

FOREIGN PATENT DOCUMENTS

| | | | |
|---|---|---|---|
| EP | 0 965 598 A1 | 12/1999 | |
| JP | 56040069 | * 9/1982 | 524/762 |
| WO | WO 98/33831 | 8/1998 | |
| WO | WO 99/46337 | 9/1999 | |
| WO | WO 00/47633 | 8/2000 | |

* cited by examiner

Primary Examiner—Judy M. Reddick
(74) Attorney, Agent, or Firm—Charles W. Almer, Esq.

(57) ABSTRACT

The present invention is directed to a vinyl acetate-ethylene polymer dispersion containing a vinyl acetate-ethylene polymer, a phosphate-functional surfactant, and a protective colloid. The invention is also directed to an aqueous coating composition having at least 65 percent by volume of pigment, on a dry solids volume basis and an amount effective to produce good scrub resistance of up to 25 percent by weight of the vinyl acetate-ethylene binder. The binder can be used to produce a high pigment volume concentration (PVC) coating, at low cost,

10 Claims, No Drawings

VINYL ACETATE/ETHYLENE EMULSION STABILIZED WITH A PHOSPHATE SURFACTANT

FIELD OF THE INVENTION

The present invention relates to vinyl acetate-ethylene copolymer dispersions stabilized with a phosphate-functional surfactant, and the use of the copolymer to provide good scrub resistance when used as the polymeric binder in high pigment volume concentration (PVC) aqueous coating compositions, particularly in latex paints.

BACKGROUND OF THE INVENTION

Manufacturers of aqueous coating formulations, and paint formulations in particular, formulate to balance the aspect of raw material cost against the required performance. Aqueous coating formulations comprise as the major components water, a film-forming polymeric binder, fillers and pigment. The most expensive raw material is the pigment which for a white paint would be titanium dioxide. This provides both wet and dry opacity to the coating system. In order to obtain the maximum benefits from the coating formulation, the ratio of pigment, filler, and binder are used in relative proportions to minimize the use of the pigment and binder and maximize the amount of filler, thereby providing the most cost effective formulation. This results in coatings being formulated with high filler contents, giving pigment volume levels of 70 percent, 75 percent and even higher. At these high levels of pigment volume concentration [PVC], and low amounts of binder, the film integrity is reduced. The film integrity is often measured by a scrub resistance test method.

U.S. Pat. No. 4,277,385 discloses the use of plastic particles as fillers in a high PVC acrylic binder formulation, while maintaining good physical properties of the paint films formed.

Several different methods have been developed to improve the scrub resistance of high PVC binders. Binders using expensive raw materials, such as silanes, have been employed. WO 98/33831 discloses a high PVC binder having good scrub resistance by using a multi-stage polymer having two different Tg polymers. U.S. Pat. No. 5,201,948 discloses a paint having a high Tg acrylic binder plus a coalescing solvent.

The use of phosphate ester surfactants to form emulsions is disclosed in U.S. Pat. Nos. 3,963,688; and 4,307,007. U.S. Pat. No. 4,506,057 discloses a styrene/butadiene copolymer binder with 40 to 80 percent filler. U.S. Pat. No. 5,284,905 discloses advantages of neutralizing a latex made with a phosphate ester surfactant.

There is a need for a binder capable of providing good scrub resistance in high PVC coatings without the need for expensive ingredients such as silanes. Ideally the binder will also be a relatively inexpensive binder, such as an ethylene-vinyl acetate (EVA) copolymer. U.S. Pat. No. 5,874,498 discloses a copolymer of ethylene and vinyl acetate without coalescing solvents, used in forming latex paints having 60% PVC.

Surprisingly it has been found that a vinyl acetate-ethylene emulsion polymer stabilized with a phosphate-functional surfactant, and in particular an alcohol ether phosphate surfactant, provides improved scrub resistance in a high PVC aqueous coating composition.

SUMMARY OF THE INVENTION

The present invention is directed to an aqueous vinyl acetate-ethylene polymer dispersion comprising:

a) a polymer formed from monomers comprising ethylene and vinyl acetate;

b) at least one phosphate-functional surfactant;

c) at least one protective colloid; and d) water.

The invention is also directed to an aqueous coating composition comprising:

a) at least 65 percent by volume of pigment, on a dry solids volume basis;

b) up to 25 percent by weight of a copolymer binder, comprising
  1) a copolymer formed from ethylene and vinyl acetate monomer, and optionally other ethylenically unsaturated monomers,
  2) a phosphate surfactant; and
  3) 0.1 to 6.0 percent by weight of a protective colloid.

DETAILED DESCRIPTION OF THE INVENTION

The present invention is directed to a novel vinyl acetate-ethylene (VA/E) polymer dispersion and its use in a high pigment volume concentration aqueous coating composition. The dispersion is stabilized with a phosphate-functional surfactant and a protective colloid.

The vinyl acetate-ethylene emulsion copolymer is formed from vinyl acetate and ethylene monomers in any known ratio, and by any conventional means. The ratio of the monomers is chosen to balance the properties of Tg, MFFT, hardness, scrub resistance and water resistance. The preferred amount of ethylene in the copolymer is from 5 to 25 weight percent, more preferably from 5 to 20 weight percent, and most preferably from 10 to 15 weight percent, based on the total amount of monomer. Preferably the polymer is formed from 30 to 95 percent by weight of vinyl acetate, more preferably from 75 to 95 percent, and most preferably from 85 to 90 percent. The Tg of the polymer of the invention is preferably from −20° C. to +60° C., more preferably −10° C. to +25° C., and most preferably from −5° C. to +10° C.

In addition to vinyl acetate and ethylene, other ethylenically unsaturated monomers may be used to form the polymer of the present invention. Examples of said monomers include, but are not limited to, (meth)acrylates; maleates; vinyl esters; itaconates; unsaturated hydrocarbons; acrylonitrile; vinyl halides such a vinyl chloride; and mixtures thereof. Preferred monomers are (meth)acrylates, such as butyl acrylate, 2-ethylhexyl acrylate, and vinyl halides. Functional monomers may also be included at up to 10 percent by weight, and more preferably up to 5 percent by weight. Examples of suitable functional monomers are silanes, carboxylic acids, such as acrylic, methacrylic and maleic acid, as well as hydroxyl and amide functional monomers, e.g. hydroxyethylacrylate, hydroxypropylacrylate, acrylamide, N-vinyl formamide, N-vinyl acetamide and the like. Crosslinking monomers may also be present, such as N-methylol acrylamide, and the n-alkyl esters thereof. Since one objective of the invention is to produce a low-cost binder for use in high PVC coatings, the use of monomers more costly than vinyl acetate and ethylene is limited. If other monomers are used, preferably they make up less than 15 percent by weight of the total amount of monomer.

The VA/E copolymer dispersion is produced by emulsion polymerization using any means known in the art, including a batch, semi-batch, or continuous process. A preferred process is a semi-batch process, with some monomer in an initial charge, with the rest of the monomer added over a period of time. The amount of vinyl acetate in the initial charge preferably ranges from 0 to 50 percent, and more preferably from 5 to 20 percent of the total amount of vinyl acetate. Ethylene may be added at pressures of up to 80 bar. The ethylene may be added all in the initial charge, added all in a delayed addition, or a combination thereof with some added in the initial charge and the remainder added slowly in a delayed feed, as a continuous addition, by several discreet additions, or a combination thereof. Process conditions such as temperature, pressure and reaction time can be determined by those skilled in the art, with preferred conditions illustrated in the Examples herein.

The emulsion polymerization of the polymer can be accomplished by aqueous emulsion polymerization procedures known in the art. Optionally, conventional seeding procedures can be employed to aid in controlling polymerization to achieve the desired average particle size and particle size distribution.

The dispersion of the present invention is polymerized in the presence of at least one phosphate-functional surfactant. Examples of phosphate-functional surfactants include alcohol ether phosphates, phenol phosphates, block copolymer phosphate surfactants, alcohol phosphates, phosphated hydroxy ethyl cellulose, alcohol alkoxylate phosphates including monoester and diester forms such as alcohol ethoxylate phosphates, alcohol propoxylate phosphates, alkyl aryl ether phosphates such as nonyl phenol ether phosphates, and alcohol butoxylated phosphates. There may be propylated rather than ethoxylated forms, phosphated acids and alcohols, sodium alkyl phosphate, and phosphated olefins. A preferred surfactant is an alcohol ether surfactant, since these offer environmental advantages. Preferred alcohol ether phosphates contain from 4 to 70 ethylene oxide units, more preferably from 4 to 50 ethylene oxide units, and most preferably from 4 to 20 ethylene oxide units. The phosphate surfactant is added to the reactor either as part of the initial charge, continuously, or some combination thereof. Preferably at least some of the surfactant is added to the reactor as part of the initial charge, with the rest added continuously over a period of time following the initiation of polymerization. In one preferred embodiment, all of the surfactant is added as part of the initial charge.

The phosphate-functional surfactant is used in the emulsion polymerization at a level of up to 5 percent by weight, and preferably from 0.5 to 3 percent by weight, based on the total amount of monomer. Lesser amounts of the phosphate-functional surfactant may be used when one or more other surfactants are also used. Anionic, cationic, non-ionic and amphoteric surfactants may be used in conjunction with the phosphate surfactant, with a non-ionic surfactant being preferred. It has been found that the inclusion of some nonionic surfactant in the polymerization may produce a more stable coating composition in some coating formulations.

The phosphate-functional surfactant can be used in either the un-neutralized, partially neutralized, or fully neutralized form. Emulsions formed with the neutralized surfactant had better stability and scrub resistance. The surfactant can be neutralized with any base known in the art, such as with sodium hydroxide, potassium hydroxide, or ammonium hydroxide.

A protective colloid is used to stabilize the polymer of the invention, and is preferably used in high PVC aqueous coating compositions containing an alcohol ether phosphate stabilized VA/E dispersion. The protective colloid is used at levels up to 6 percent by weight, preferably from 0.1 to 3 percent by weight, and most preferably 0.5 to 2 percent by weight based on the total monomer content. Colloids useful in the present invention include, but are not limited to hydroxyalkyl celluloses such as hydroxymethyl cellulose, hydroxyethyl cellulose, and hydroxypropyl cellulose; polyvinyl alcohol, starch, polyvinyl pyrridine, polyvinyl pyrrolidone, and mixtures thereof. The useful colloids can have a wide range of molecular weights. One skilled in the art will recognize that with polyvinyl alcohol the degree of hydrolysis can be varied, and in the case of hydroxyalkyl celluloses the degree of ethoxylation may vary. A preferred protective colloid is hydroxyethyl cellulose.

Other adjuvants commonly used in an emulsion polymerization may also be present in the polymer dispersion, including, but not limited to initiators, oxidizing and reducing agents, buffers, molecular weight controllers, defoamers, biocides, and other such ingredients.

The dispersion of the present invention can be made to any solids level as known in the art. Generally the dispersion solids level as made is between 40 and 70 percent, and more preferably from 50 to 60 percent solids based on the dispersion.

In general smaller particle size dispersions were found to provide better scrub resistance. While not being bound to any particular theory, it is believed that smaller particles are better able to cover the filler particles in a high PVC coating composition, and thereby providing better resistance to physical abrasion. Preferably the average particle size is from 0.01 to 1 micrometer, more preferably less than 0.4 micrometers.

Dispersions having a pH of from 3 to 10 are preferred, and dispersions having a pH of from 5 to 9 are more preferred. It has been found that dispersions having a higher pH provided films having better scrub resistance.

The dispersion of the present invention is useful in forming aqueous coating compositions, especially for coating compositions having a high pigment volume concentration. The dispersion is useful as a binder, providing scrub resistance in coating compositions having a PVC of up to 95 volume percent. Preferably the PVC of the coating composition of the invention is above 65 volume percent, more preferably 70 to 90 volume percent, even more preferably 75 to 90 volume percent, and most preferably 80 to 90 volume percent. Pigment, or fillers useful in the coating composition of the present invention include any inert organic and inorganic pigment typically known in the art, including but not limited to, titanium oxide, calcium carbonate, calcium magnesium carbonate (Dolomite), aluminum silicate (China Clay), magnesium silicate (talc), mica, starch, plastics, clay, glass fibers, kaolin, wood meal, and mixtures thereof.

The aqueous coating composition is formulated using techniques known to those skilled in the art of coatings formulations. Generally, water, defoamer, stabilizer, pigment, filler and surfactant are combined under high shear forces, where the loose agglomerates of the pigments and fillers are separated into their primary particles. This dispersion should remain, as far as possible, as a stable state in order to prevent reflocculation or reagglomeration during the remaining additions to the mixture. Such reflocculation or reagglomerationcould affect the optical properties of the coating composition.

Additional water, latex binder, and additives such as rheology modifiers, biocides, anti-freezing agents, preservatives, surfactants, sequestering agents, coalescing agents, defoaming agents, humectants, colorants, waxes, and fungicides are added to the dispersion and the entire batch is blended and adjusted to the desired viscosity.

The coating compositions may be applied to a wide variety of materials known in the art, by means known in the art such as spraying, brushing, and rolling.

The following examples are presented to further illustrate and explain the present invention and should not be taken as limiting in any regard.

EXAMPLE 1

A binder was prepared by emulsion polymerization in the following manner:

Hydroxyethylcellulose (HEC, NATROSOL 250 GR) was added to cold deionised water (1), heated to 60° C., held for one hour to dissolve and then cooled down to 30° C. The surfactant was then added to the water phase and the pH adjusted up or down to 3.2–3.5 by adding either sodium hydroxide or formic acid. The ferric chloride was then added and the water phase loaded to the reactor and washed in with the remainder of deionised water (2). The reactor was then sealed and purged twice with nitrogen and once with ethylene to 7 bar. The agitator was switched on to approx. 450 rpm. Initially 20% of the vinyl acetate (282 g) was added, followed by all of the ethylene (192 g) while heating to 30° C. At 30° C., continuous additions of the remaining monomer and the initiators were commenced. The monomer was added over 4 hours at a continuous rate. The initiators were added over 5 hours, with final hour at double the addition rate of the first four hours. The internal temperature was increased to 60° C. over the first hour and maintained at 60° C. until the end of the additions. When the additions were complete, the reactor was cooled down to 30° C. and the tertiary butyl hydroperoxide (tBHP) added over 5–10 minutes. The emulsion was then run out into a container containing the KATHON LXE (Rohm and Haas Company) and left to degas overnight before filtering using a 120-mesh nylon filter.

The formulation below is a general one for all the formulations. (Theoretical non volatile=55.09%)

TABLE 1

| Materials | Weight | pphm | Activity | Solids |
| --- | --- | --- | --- | --- |
| Water Phase | | | | |
| Deionised water (1) | 500.00 | 25.00 | 0% | 0.00 |
| Natrosol 250 GR | 16.00 | 1.00 | 100% | 16.00 |
| SURFACTANT | 32.00 | 2.00 | 100% | 32.00 |
| Formic acid | 1.40 | 0.09 | 90% | 1.26 |
| FeCl$_3$ (1% Fe$^{3+}$) | 0.80 | 0.05 | 1% | 0.01 |
| Deionised water (2) | 340.00 | 32.63 | 0% | 0.00 |
| Monomer - Initial charge | | | | |
| Vinyl Acetate | 282.00 | 17.6 | 100% | 282.00 |
| Ethylene | 192.00 | 12.00 | 100% | 192.00 |
| Monomer - slow add | | | | |
| Vinyl Acetate | 1126 | 70.4 | 100% | 1126 |
| Catalysts | | | | |
| Sodium Persulphate | 5.60 | 0.35 | 100% | 5.60 |
| Sodium Bicarbonate (1) | 4.00 | 0.25 | 100% | 4.00 |
| Deionised water (3) | 200.00 | 12.50 | 0% | 0.00 |
| Formosul | 2.40 | 0.15 | 76% | 1.82 |
| Deionised water (4) | 200.00 | 12.50 | 0% | 0.00 |

TABLE 1-continued

| Materials | Weight | pphm | Activity | Solids |
| --- | --- | --- | --- | --- |
| FOS | | | | |
| tBHP | 3.20 | 0.20 | 70% | 2.24 |
| Sodium Bicarbonate (2) | 1.60 | 0.10 | 100% | 1.60 |
| Deionised water (5) | 30.00 | 1.88 | 0% | 0.00 |
| Kathon LXE | 4.00 | 0.25 | 1.5% | 0.06 |

EXAMPLE 2

Paint Formulation and Testing

Paints were formulated using the emulsion binder of Example 1 in a 84% PVC paint as follows:

| Raw Material | Weight/g |
| --- | --- |
| TiO$_2$ | 55.8 |
| calcium carbonate | 368.8 |
| calcium carbonate | 194.3 |
| thickener | 73.8 |
| pigment dispersant | 0.6 |
| pigment dispersant | 6.0 |
| water | 207.8 |
| biocide | 1.1 |
| defoamer | 1.3 |
| 50% potassium hydroxide soln. | 0.2 |
| Binder (54.1%) | 90.2 |
| Total | 1000 |

The paint was then tested for scrub resistance using the test method described in DIN 53778 Part 2, which involves preparing a paint panel of known (standard) thickness onto a specified substrate, allowing it to dry under standard controlled conditions, and scrubbing with a standard weighted brush lubricated with a surfactant solution, until the coating is deemed to fail according to the end point as specified. The 28-day scrub resistance result is reported in Table 2.

EXAMPLE 3

Copolymer binders were made in the same manner as in Example 1 with the variations listed below. In each case the surfactant was added any the amount of DI water (1) was adjusted to maintain the same solids level. Each of the binders was then formulated into the 84 percent PVC paint formulation of Example 2, and the scrub resistance measured.

TEXAPON NSO IS (comparative) is sodium lauryl ether sulphate, 2–3 EO units, made by Cognis.

EMPICOL LXV (comparative) is sodium lauryl sulfate made by Albright & Wilson.

AEROSOL A102 (comparative) is a half ester sulphosuccinate made by Cytec.

LANKROPOL OPA (comparative) is a sulphonated oleic acid made by Akeros Chemicals.

RHODAFAC RS-710 is alcohol ether phosphate, 10 EO units made by Rhodia.

RHODAFAC RS-610 is alcohol ether phosphate, 6 EO units, made by Rhodia.

RHODAPEX AB/20S (comparative) is alcohol ether sulphate, 10 EO units made by Rhodia.

RHODAFAC RS-960 is alcohol ether phosphate with 50 EO units, made by Rhodia.

EMPHOS CS 141 is a nonyl phenol ether phosphate with 9 EO units, made by Witco

DISPONIL AEP 5300 is a nonyl phenol ether phosphate, made by Cognis.

Notes:

*The neutralized surfactant examples (3L–3P) were made as follows:

The surfactant was added to part of the water (2) and the solution adjusted to a pH of 3.2–3.5 using NaOH pellets. Ferric chloride was then added to this solution. The solution was then washed into the NATROSOL 250 GR solution, which had been cooled to 30° C., with the remainder of the water (2).

**Example 3N was tested in an accelerated scrub test. Test results in the scrub test described above generally show about twice the scrub resistance as found in the accelerated test.

TABLE 2

| Ex. | Surfactant | Wt % | Vinyl Acetate In initial, % | Colloid NATROSOL 250 GR | Wt % | Ave. Scrub Resistance |
|---|---|---|---|---|---|---|
| 3A | TEXAPON NSO IS (Comparative) | 2 | 20 | NATROSOL 250 GR | 1 | 150 |
| 3B | EMPICOL LXV (comparative) | 2 | 20 | NATROSOL 250 GR | 1 | 25 |
| 3C | AEROSOL A102 (comparative) | 2 | 20 | NATROSOL 250 GR | 1 | 75 |
| 3D | LANKROPOL OPA (comparative) | 2 | 20 | NATROSOL 250 GR | 1 | 37 |
| 3E | RHODAFAC RS-710 | 2 | 20 | NATROSOL 250 GR | 1 | 350 |
| 3F | RHODAFAC RS-610 | 2 | 20 | NATROSOL 250 GR | 1 | 35 |
| 3G | RHOAPEX AB/20S | 2 | 20 | NATROSOL 250 GR | 1 | 140 |
| 3H | RHODAFAC RS-710 SURFYNOL 104 PA | 1 1 | 20 | NATROSOL 250 GR | 1 | 140 |
| 3I | RHODAFAC RS-710 | 2 | 20 | TYLOSE E89913 | 1 | 315 |
| 3J | RHODAFAC RS-710 | 3 | 20 | NATROSOL 250 GR | 1 | 35 |
| 3K | RHOAPEX AB/205 (comparative) | 2 | 20 | TYLOSE E89913 | 1 | 215 |
| 3L* | RHODAFAC RS-710 (neutralized) | 3 | 20 | NATROSOL 250 GR | 1 | 550 |
| 3M* | RHODAFAC RS-610 (neutralized) | 3 | 20 | NATROSOL 250 GR | 1 | 50 |
| 3N* | RHODAFAC RS-960 (neutralized) | 2 | 20 | NATROSOL 250 GR | 1 | 120** |
| 3O* | EMPHOS CS141 (neutralized) | 2 | 20 | NATROSOL 250 GR | 1 | 625 |
| 3P* | DISPONIL AEP 5300 (neutralized) | 2 | 20 | NATROSOL 250 GR | 1 | 500 |

EXAMPLE 4

A polymer could be made in the same manner as in Example 1 with the monomer mixture of 50 percent by weight of vinyl acetate added partly in the initial charge and the rest delayed, 30 percent by weight vinyl chloride and 20 percent by weight ethylene. Two percent alcohol ether phosphate surfactant with 10 EO units could be used as the surfactant and 1 percent hydroxy ethyl cellulose as the colloid. The resulting polymer would be expected to have a Tg of about +10° C. When formulated into the coating composition of Example 2, good scrub resistance would be expected.

What is claimed is:

1. An aqueous vinyl acetate-ethylene polymer dispersion comprising:
   a) a polymer formed from monomers consisting of ethylene and vinyl acetate, and optionally one or more monomers selected from the group consisting of (meth) acrylates, maleates vinyl esters, itaconates, unsaturated hydrocarbons, acrylonitrile, and vinyl halides;
   b) from 0.5 to 5 percent by weight, based on the total amount of monomer, of at least one alcohol ether phosphate surfactant having from 4 to 70 ethylene oxide units;
   c) at least one protective colloid; and
   d) water.

2. The dispersion of claim 1 wherein said monomers comprise from 5 to 25 percent by weight of ethylene, based on the total polymer solids.

3. The dispersion of claim 1 wherein said monomers comprise at least 75 percent by weight of vinyl acetate.

4. The dispersion of claim 1 wherein said protective colloid is hydroxyalkyl cellulose, polyvinyl alcohol, or a mixture thereof.

5. The dispersion of claim 4 wherein said protective colloid is hydroxyethyl cellulose.

6. An aqueous coating composition comprising;
   a) from 65 to 95 percent by volume of pigment, on a dry solids volume basis:
   b) an amount effective to produce good scrub resistance of up to 25 percent by weight of a copolymer emulsion binder, based on the total aqueous coating composition, comprising
      1) a copolymer formed from ethylene and vinyl acetate monomer, and optionally other ethylenically unsaturated monomer(s),
      2) from 0.5 to 5 percent by weight, based on the total amount of monomer, of an alcohol ether phosphate surfactant having from 4 to 70 ethylene oxide units;
      3) 0.1 to 6.0 percent by weight of a protective colloid, based on the amount of monomer; and
      4) water.

7. The coating composition of claim 6 comprising 70 to 95 percent by volume of pigment.

8. The coating composition of claim 7 comprising 75 to 90 percent by volume of pigment.

9. The coating composition of claim 8 comprising 80 to 90 percent by volume of pigment.

10. The coating composition of claim 6 comprising 0.1 to 3 percent by weight of a protective colloid, based on the amount of monomer.

* * * * *